United States Patent
Goubin et al.

(10) Patent No.: US 7,050,581 B1
(45) Date of Patent: *May 23, 2006

(54) METHOD FOR MAKING SECURE ONE OR SEVERAL COMPUTER INSTALLATIONS USING A COMMON SECRET KEY ALGORITHM, USE OF THE METHOD AND A COMPUTER SYSTEM UTILIZING THE METHOD

(75) Inventors: Louis Goubin, Paris (FR); Jacques Patarin, Viroflay (FR)

(73) Assignee: CP8 Technologies, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/719,193

(22) PCT Filed: Apr. 7, 2000

(86) PCT No.: PCT/FR00/00902

§ 371 (c)(1),
(2), (4) Date: Dec. 8, 2000

(87) PCT Pub. No.: WO00/62473

PCT Pub. Date: Oct. 19, 2000

(30) Foreign Application Priority Data

Apr. 9, 1999  (FR) ................................. 99 04441

(51) Int. Cl.
  *H04L 9/28* (2006.01)
(52) U.S. Cl. ....................................... 380/28; 380/263
(58) Field of Classification Search ................ 713/151, 713/190, 193, 200; 380/281, 284
See application file for complete search history.

(56) References Cited

U.S. PATENT DOCUMENTS

| | | | | |
|---|---|---|---|---|
| 4,993,068 A | * | 2/1991 | Piosenka et al. | ............ 713/186 |
| 5,588,059 A | * | 12/1996 | Chandos et al. | ............ 380/279 |
| 5,850,443 A | * | 12/1998 | Van Oorschot et al. | ..... 380/285 |
| 6,314,409 B1 | * | 11/2001 | Schneck et al. | ............... 705/54 |
| 6,480,959 B1 | * | 11/2002 | Granger et al. | ............. 713/189 |
| 6,658,569 B1 | * | 12/2003 | Patarin et al. | .............. 713/194 |

FOREIGN PATENT DOCUMENTS

| | | |
|---|---|---|
| FR | 2 672 402 A | 8/1992 |
| WO | WO 98 52319 A | 11/1998 |

OTHER PUBLICATIONS

Kocher et al., "Introduction to Differential Power Analysis and Related Attacks," ©1998 Cryptography Research Inc., pp. 1-5.*

* cited by examiner

*Primary Examiner*—Emmanuel L. Moise
*Assistant Examiner*—Nadia Khoshnoodi
(74) *Attorney, Agent, or Firm*—Miles & Stockbridge P.C.; Edward J. Kondracki (57) ABSTRACT

The invention relates to a method for protecting one or more computer systems using the same secret key (Ks) cryptographic algorithm, characterized in that the way in which said calculation is performed depends, for each computer system and for each secret key, on secret data (Ds) stored in a secret area of the computer system or systems.

21 Claims, 8 Drawing Sheets

METHOD FOR MAKING SECURE ONE OR SEVERAL COMPUTER INSTALLATIONS USING A COMMON SECRET KEY ALGORITHM, USE OF THE METHOD AND A COMPUTER SYSTEM UTILIZING THE METHOD

FIELD OF THE INVENTION

The present invention relates to a method for protecting one or more computer systems using the same secret key cryptographic algorithm, a utilization of the method and the computer system.

BACKGROUND OF THE INVENTION

More precisely, the purpose of the method is to make the way in which a calculation is performed dependent on secret data, which data can be different depending on the computer system involved or the secret key used. The objective is to enable computer systems not to be vulnerable to a certain type of physical attack known as "Differential Key Differential Power Analysis," abbreviated DKDPA, which seeks to obtain information on a secret key by studying the electric power consumption of the computer system or systems during several executions of the calculation performed with different secret keys, at least one of which is known by the attacker (for example if he has been able, for at least one of these calculations, to set the secret key himself).

The cryptographic algorithms considered herein use a secret key to calculate a piece of output information from a piece of input information; this can involve an encryption, decryption, signature, signature verification, authentication or non-repudiation operation. They are constructed so that an attacker who knows the inputs and the outputs cannot in practice deduce any information on the secret key itself.

The invention herein is therefore interested in a broader class than the one traditionally designated by the expression secret key photographic algorithms, or symmetric algorithms. In particular, all of what is described in the present patent application also applies to so-called public key or asymmetric algorithms, which actually include two keys, one public, the other secret, the latter being the one sought by the attacks described below.

DESCRIPTION OF RELATED ARTS

Attacks of the Power Analysis type, developed by Paul Kocher and Cryptographic Research (see the document "Introduction to Differential Power Analysis and Related Attacks" by Paul Kocher, Joshua Jaffe, and Benjamin Jun, Cryptography Research, 870 Market St., Suite 1008, San Francisco, Calif. 94102, a publication of the HTML document incorporated into the present application as a reference), start with the assumption that in reality, the attacker can acquire information other than just the input and output data during the execution of the calculation, such as for example the electric power consumption of the microcontroller or the electromagnetic radiation emitted by the circuit.

Differential Power Analysis, abbreviated DPA, is an attack that makes it possible to obtain information on the secret key contained in the computer system by performing a statistical analysis of the power consumption measurements performed on a large number of calculations with this same key.

As a non-limiting example, the case of the DES (Data Encryption Standard) algorithm, will be considered. A description can be found in any of the following documents:
FIPS PUB 46-2, Data Encryption Standard, 1994;
FIPS PUB 74, Guidelines for Implementing and Using the NBS Data Encryption Standard, 1981;
ANSI X3.92, American National Standard, Data Encryption Algorithm, 1981;
ISO/IEC 8731:1987, Banking-Approved Algorithms for Message Authentication—Part 1: Data Encryption Algorithm (DEA),
or in the following book:
Bruce, Schneier, Applied Cryptography, $2^{nd}$ Edition, John Wiley & Sons, 1996, page 270.

The above-mentioned documents are incorporated into the present application as references.

Figure 2A:
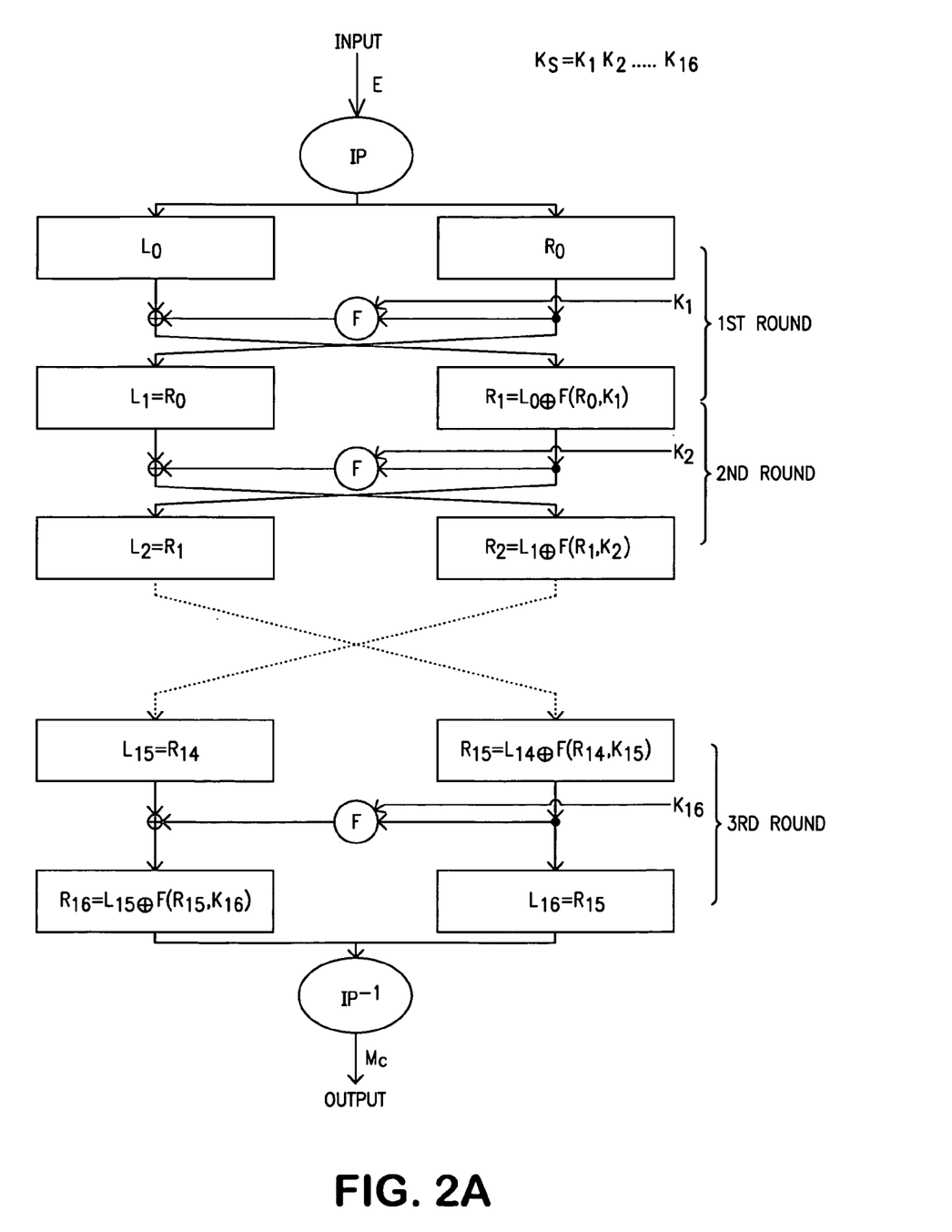
FIGS. 2A and 2B schematically represent the DES ("Data Encryption Standard") enciphering/deciphering process of the prior art.

The DES algorithm is implemented in 16 steps called rounds, represented in FIG. 2A. In each of the 16 rounds, a transformation F is performed on 32 bits ($R_1$), which in the first round constitute half ($R_0$) of the input message (E). In each of the rounds, a part ($R_i$) formed of 32 bits of the information to be encrypted is combined in the function F with a part ($K_i$) formed of 32 bits of the secret encryption key (Ks). This function F performs, in each round, eight nonlinear transformations of 6 bits into 4 bits, noted (FIGS. 1b, 2b) $S_1, S_2, \ldots, S_8$, that are encoded, each stored in an encoding table called an S-box. These eight S-boxes are identical for all cards or for all computer systems. Only the encryption key changes from one card to another or from one computer system to another. Each S-box is a table with 64 ($2^6$) rows of four 1-bit columns. Quite clearly, these tables can be arranged differently in memory in order to save space.

Figure 2B:
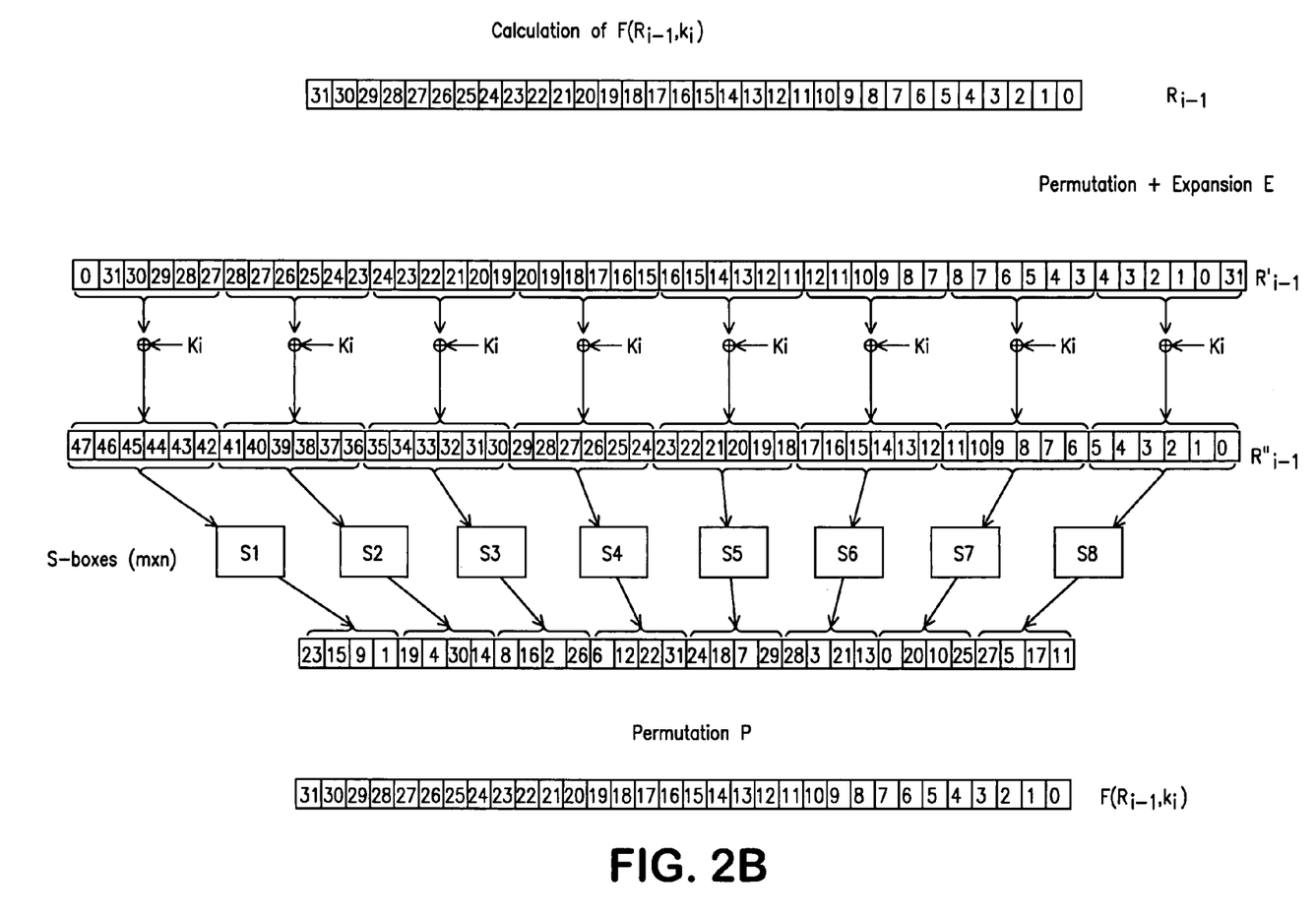

From the construction of the DES algorithm, we see in FIG. 2B that the transformations performed by the function F on the 32 bits of information constituting ($R_i$) can always fall into one of the following categories:
a permutation of the bits of $R_i$; followed by an expansion of $R_i$ to 48 bits, in order to obtain the information $R_i'$;
an exclusive-OR of $R_i'$ with a variable $K_i$ depending solely on the key or a subkey, in order to obtain a 48-bit result $R_i''$;
a nonlinear transformation of $R_i''$ by applying a different S-box to each 6-bit portion constituting $R_i''$;
a permutation called P (this permutation is defined and imposed by the DES standard) on the 32 bits output from the set constituted by the eight S-boxes ($S_1$ through $S_8$).

The result obtained by applying the function F is combined in an exclusive-OR either with the other 32 bits of the message, or with the 32 bits of the result supplied in step i-2, in order to satisfy the relation $R_i = R_{i-2} \oplus F(R_{i-1}, K_i)$, FIG. 2A.

The DPA type attack on the DES can be performed on the DES in the following way:

$1^{st}$ step: Power consumption measurements are made on the first round, for 1,000 DES calculations. The input values of these 1,000 calculations are notated $E[1], \ldots, E[1,000]$. The corresponding 1,000 power consumption curves measured during these calculations are notated $C[1], \ldots, C[1,000]$. The average-curve CM of the 1,000 consumption curves is also calculated.

$2^{nd}$ step: For example, let us consider the first output bit of the first S-box during the first round. Let b be the value of this bit. It is easy to see that b depends only on the 6 bits of the secret key. The attacker forms a hypothesis on the 6 bits in question. He calculates, from each of these 6 bits and the E[i], the expected theoretical values for b. This makes it possible to separate the 1,000 inputs E[1], . . . , E[1,000] into two categories: those that yield b=0 and those that yield b=1.

$3^{rd}$ step: Next the average CM' of the curves corresponding to inputs in the first category, i.e. for which b=0, is calculated. If CM and CM' have a notable difference, the values retained for the 6 key bits are considered to be the correct ones. If CM and CM' do not have any appreciable difference in the statistical sense, i.e., no difference that is substantially greater than the standard deviation of the noise measured, the $2^{nd}$ step is repeated with another choice for the 6 bits.

$4^{th}$ step: Steps 2 and 3 are repeated with a target bit b output from the second S-box, then from the third S-box, and so on through the eighth S-box. Thus, the 48 bits of the secret key are eventually obtained.

$5^{th}$ step: The 8 remaining bits can be found through an exhaustive search.

This attack does not require any knowledge on the individual power consumption of each instruction, or on the time position of each of these instructions. It applies in the same way if we assume that the attacker knows some outputs of the algorithm and the corresponding consumption curves. It is based solely on the fundamental hypothesis according to which:

Fundamental hypothesis: there exists an intermediate variable, appearing during the calculation of the algorithm, such that the knowledge of several key bits, in practice less than 32 bits, makes it possible to decide whether or not two inputs, or respectively two outputs, yield the same value for this variable.

All the algorithms that use S-boxes, such as DES, are potentially vulnerable to DPA, since the usual embodiments generally fall within the category of the hypothesis mentioned above.

The attacks known as High-Order Differential Power Analysis, abbreviated HO-DPA, are a generalization of the DPA attack described above. They can use several different sources of information; in addition to power consumption, they can perform measurements of electromagnetic radiation, temperature, etc., and implement statistical operations that are more sophisticated than the simple notion of averaging, and intermediate variables (generalizing the bit b defined above) that are less elementary. Nevertheless, they are based on exactly the same fundamental hypothesis as DPA.

One solution for eliminating the risk of DPA or HO-DPA attacks consists, for a cryptographic calculation process using a secret key Ks, of modifying the implementation of the algorithm so that the aforementioned fundamental hypotheses is no longer verified, since there is no longer any calculated intermediate variable that depends on the knowledge of an easily accessible subset of the secret key.

To this end, the cryptographic calculation process is first separated in the computer system into several distinct calculation process parts $PPC_1$ through $PPC_k$ (FIG. 3) performed simultaneously, then secondly, the final value V corresponding to that obtained by the cryptographic calculation without a separation is reconstituted in the computer system from the partial intermediate results v1 through vk obtained by implementing the aforementioned distinct calculation process parts $PPC_1$ through $PPC_k$.

This separation is performed by the modified calculation algorithm, which replaces each intermediate variable v occurring during the calculation and depending on the input (or output) data with k variables $v_1, v_2, \ldots, V_k$, such that $v_1, v_2, \ldots,$ and $v_k$ make it possible, as necessary, to reconstitute v. More precisely, this means that there exists a function f that makes it possible to determine v, such that $v=f(v_1, v_2, \ldots, V_k)$ and such that the separation performed by the modified algorithm satisfies this function. It is also assumed that f preferably satisfies the following first condition:

Condition No. 1: Let i be a subscript (in the broad sense) between 1 and k. The knowledge of a value v never makes it possible, in practice, to deduce information on all of the values vi such that there exists a (k–1)-tuple $(v_1, \ldots, v_{i-1}, v_{i+1}, \ldots, v_k)$ that satisfies the equation $f(v_1, \ldots, v_k)=v$.

The algorithm is then "translated" by replacing each intermediate variable V depending on input (or output) data with the k variables $v_1, v_2, \ldots, v_k$.

In order to guarantee the maximum security of the modified algorithm in its new form, the following additional condition (Condition No. 2) is imposed on the function f:

Condition No. 2: The function f is such that the transformations to be performed on $v_1, v_2, \ldots,$ or $v_k$ during the calculation in place of the transformations normally performed on v, can be implemented without having to recalculate v.

Let us return to the example of the DES algorithm. A concrete implementation of the method described above consists of constructing the modified calculation algorithm $DES_M$ so that it separates each intermediate variable v occurring during the calculation and depending on input or output data into, for example, two variables $v_1$ and $v_2$, which means that we take k=2. Let us consider the function $f(v_1, v_2)=v=v_1 \oplus v_2$ in the above example No. 1, which satisfies Condition No. 1 by construction. From the construction of the DES algorithm, it is easy to see that the transformations it performs on v can always fall into one of the following five categories:

a permutation of the bits of v;

an expansion of the bits of v;

an exclusive-OR of v with another variable v' of the same type;

an exclusive-OR of v with a variable c that depends only on the key or on a subkey;

a nonlinear transformation of v by an S-box.

The first two categories correspond to linear transformations on the bits of the variable v. For these categories, Condition No. 2 is very easy to verify, and it is sufficient to perform, in place of the transformation normally performed on v, the permutation or expansion on $v_1$, then on $v_2$, and the relation $f(v_1, v_2)=v$ that was true before the transformation remains equally true afterwards.

Likewise, in the third case, it is sufficient to replace the calculation $v''=v \oplus v'$ with $v''_1=v_1 \oplus v'_1$ and $v''_2=v_2 \oplus v'_2$. The relations $f(v_1, v_2)=v$ and $f(v'_1, v'_2)=v'$ yield $f(v''_1, v''_2)=v''$ and Condition No. 2 is again verified.

In the exclusive-OR of v with a variable c that is dependent only on the key or a subkey, Condition No. 2 is also very easy to satisfy: it is sufficient to replace the calculation of $v \oplus c$ with $v_1 \oplus c$, or $v_2 \oplus c$, which fulfills Condition No. 2.

Figure 4:
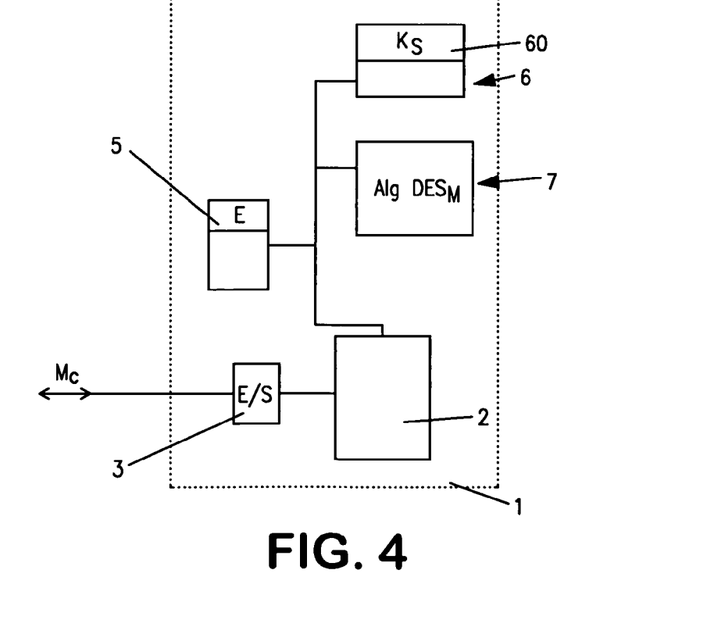
FIG. 4A represents, by way of illustration, an implementation of the method of the prior art in a standard DES encryption algorithm.
FIG. 4B represents a flow chart of a particular implementation of a modified cryptographic calculation process such as $DES_M$ according to a prior invention.
FIG. 4C represents a variant of implementation of a method as illustrated in FIG. 3.
FIG. 4D represents a variant of implementation of a method as illustrated in FIG. 4b.
FIG. 4E represents another particular implementation of a method of a prior invention, based on a secret bijective transformation, applied to a nonlinear transformation used in a modified cryptographic calculation process such as $DES_M$.
FIG. 4F represents a computer system in which the standard encryption algorithm of the prior art is used.
Figure 4A:
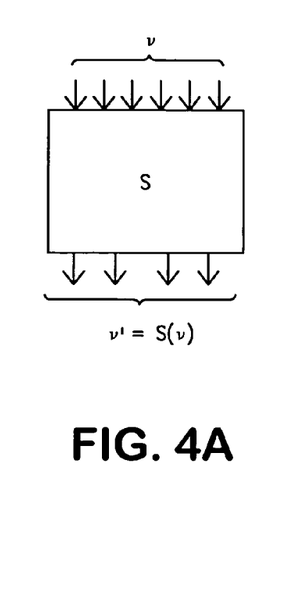
Figure 4B:
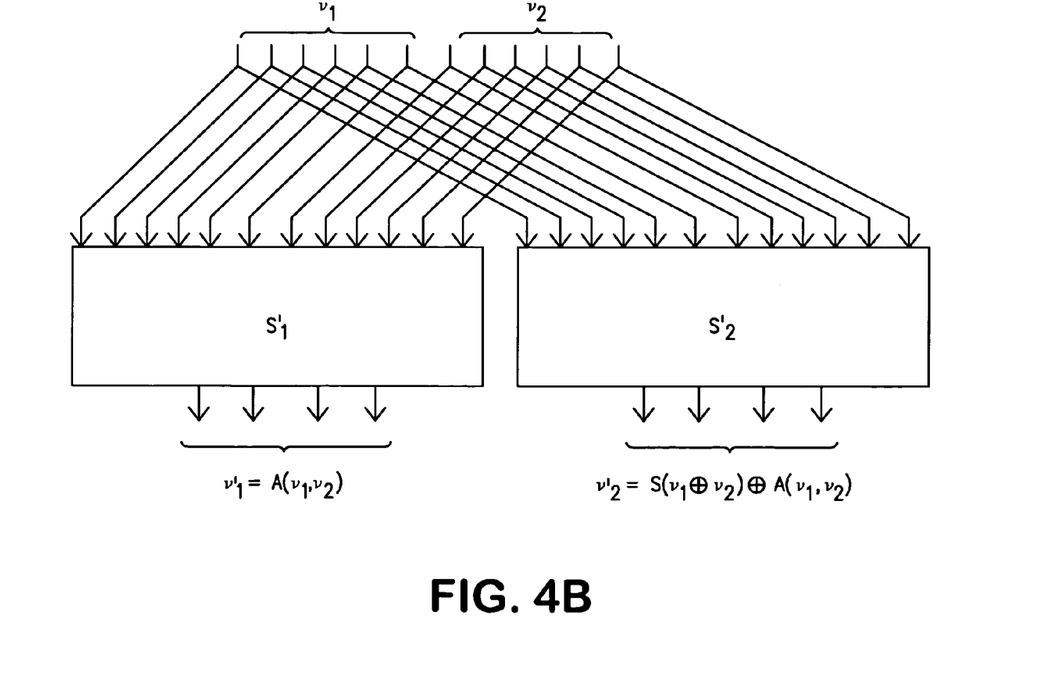

Finally, in place of the given nonlinear transformation of the prior art $v'=S(v)$, represented in FIG. 4A and embodied in the form of an S-box which, in this example, accepts 6-bit inputs and yields 4-bit outputs, the computer system performs the transformation $(v'1, v'2)=S'(v1, v2)$ in a variant of embodiment by means of two new S-boxes, each of which can be in the form of a table, this time from 12 bits to 4 bits. In order to guarantee the equality $f(v'1), v'2)=v'$, it is sufficient to choose:

$(v'_1, v'_2)=S'(v_1, v_2)=(A(v_1, v_2), S(v_1 \oplus v_2) \oplus A(v_1, v_2))$ i.e. $v'1=A(v_1, v_2)$ and $v'_2=S(v_1 \oplus v_2) \oplus A(v_1, v_2)$ where A designates a secret, random transformation of 12 bits into 4 bits. The first S-box (S'$_1$, FIG. 4b) corresponds to the table of the transformation $(v_1, v_2) \cdot A(v_1, v_2)$, which associates $(v_1, v_2)$ with $A(v_1, v_2)$, and the second S-box (S'$_2$) corresponds to the table of the transformation $(v_1, v_2) \cdot S(v_1 \oplus v_2) \oplus A(v_1, v_2)$ which associates $(v_1, v_2)$ with $S(v_1 \oplus v_2) \oplus A(v_1, v_2)$. The presence of the random function A makes it possible to guarantee Condition No. 1. The use of tables also makes it possible to avoid having to calculate v1⊕v2, thereby making it possible to satisfy Condition No. 2.

The transformation or conversion tables can be stored in a ROM of the microcomputer card when the computer system is constituted by a microcomputer card.

Figure 4C:
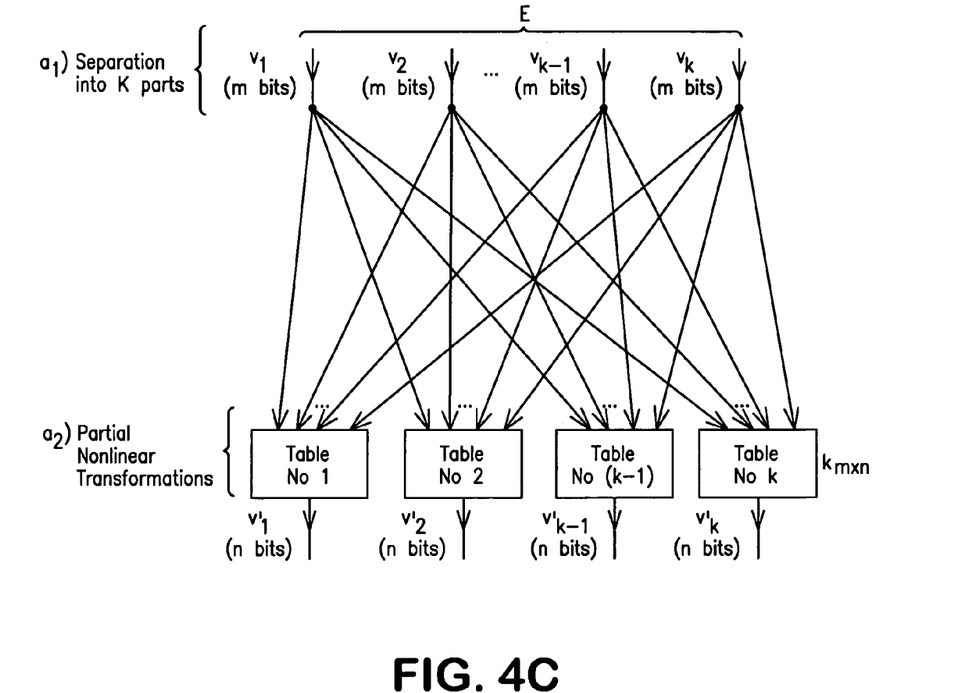

Thus, for a computational step of the nonlinear transformation type implemented by a standard cryptographic calculation process like DES, the separation, as represented in FIG. 4C, can be into k parts. As compared to a standard cryptographic calculation process using nonlinear transformations of m bits into n bits, described by conversion tables in which the n output bits of the transformation are read at an address that is a function of the m input bits, the modified cryptographic calculation algorithm DES$_M$ replaces each nonlinear transformation of m bits into n bits of the standard cryptographic calculation process applied to an intermediate m-bit variable playing the role of an input variable E, without a separation, with a plurality k of partial nonlinear transformations of km bits into n bits, each applied to a partial intermediate variable of the set k of partial intermediate m-bit variables $v_1$ through $v_k$. According to a particularly remarkable aspect of the method that is the subject of the invention, this partial nonlinear transformation is described and embodied by k partial conversion tables in which each of the n output bits of each table constitutes, respectively, the variable v'$_1$, the variable v'$_2$, . . . , the variable v'$_k$ of the transformation, and is read at an address that is a function of one of the k groups of km input bits.

In the above example of DES and in relation to FIG. 4C, it is noted that k=2, n=4 and m=6.

In a first variant, in order to save space in the ROM, it is entirely possible to use the same random function A for each of the eight S-boxes of the conventional description of DES, which makes it possible to have only nine new S-boxes to store instead of sixteen.

Figure 4D:
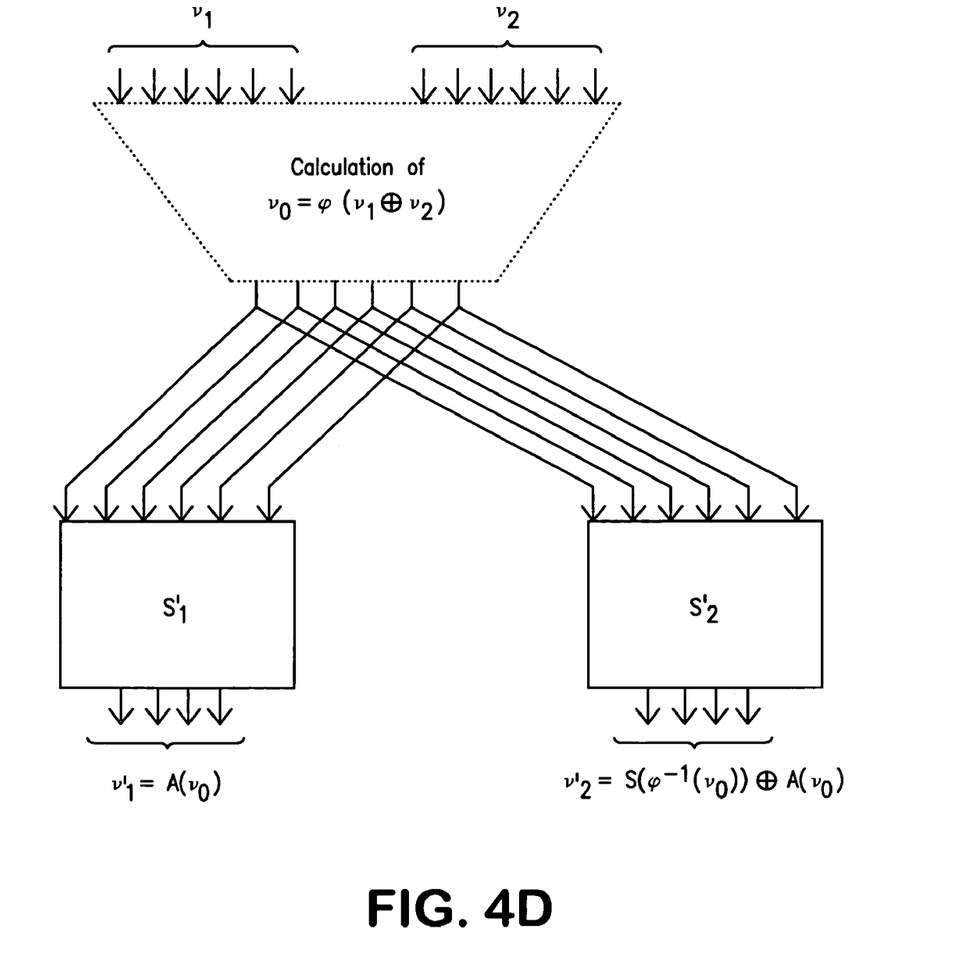

A second variant, called Variant No. 2, will be described in connection with FIG. 4D.

In order to reduce the size of the ROM required to store the S-boxes, it is also possible, in place of each nonlinear transformation v'=S(v) of the initial implementation expressed in the form of an S-box (which in the example of DES accepts 6-bit inputs and yields 4-bit outputs), to use the following method, which in this second variant performs the transformation $(v'_1, v'_2)=S'(v_1, v_2)$ by means of two S-boxes (S'$_1$; S'$_2$), each containing a table of 6 bits into 4 bits. The initial implementation of the calculation of v'=S(v) is replaced in the modified algorithm by the following two successive calculations:

$v_0=\phi(v_1 \oplus v_2)$ which uses a secret, bijective function of 6 bits into 6 bits, and $(v'_1, v'_2)=S'(v_1, v_2)=(A(v_0), S(\phi^{-1}(v_0)) \oplus A(v_0))$ i.e. $v'1=A(v0)$, $v'2=S(\phi^{-1}(v0)) \oplus A(v_0)$ where A designates a secret, random transformation of 6 bits into 4 bits. The first S-box (referenced S'$_1$ in FIG. 4D) corresponds to the table of the transformation $v_0 \to A(v_0)$ which associates v0 with $A(v_0)$, and the second S-box (referenced S'$_2$ in FIG. 4D) corresponds to the table of the transformation $v_0 \to S(\phi^{-1}(v_0)) \oplus A(v_0)$, which associates v0 with $S(\phi^{-1}(v_0)) \oplus A(v_0)$. By construction, we still have the equality $f(v'_1, v'_2)=v'$. The presence of the random function A makes it possible to guarantee Condition No. 1. The use of tables makes it possible to avoid having to calculate $\phi^{-1}(v_0)=V_1 \oplus v_2$.

Figure 4E:
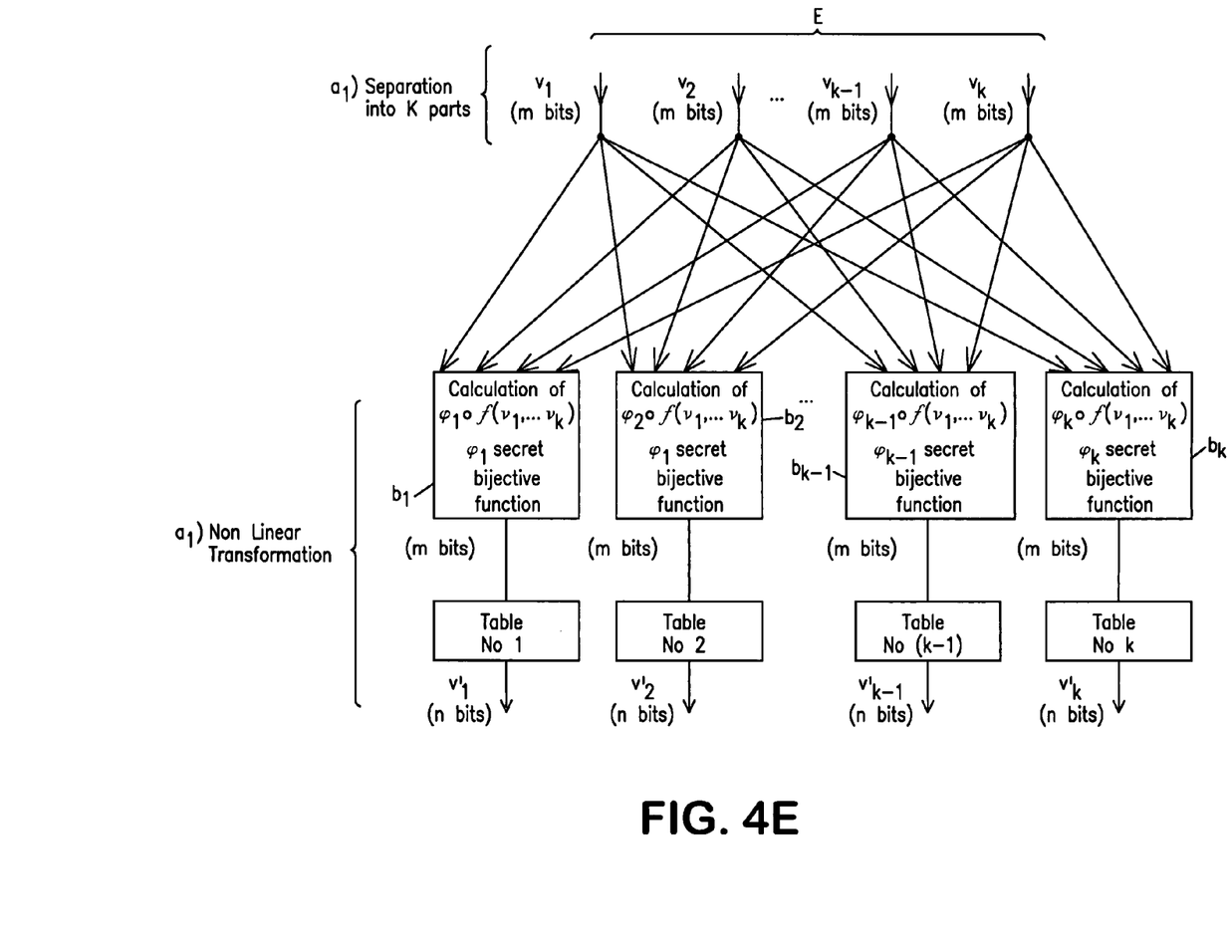

FIG. 4E represents a corresponding computational step of the nonlinear transformation type implemented within the framework of the standard cryptographic calculation process, such as DES, as modified in accordance with the method that is the subject of the invention according to Variant No. 2. In addition to the separation into k parts applied to the input variable E for the nonlinear transformations of m bits into n bits, described by conversion tables in which the n output bits are read at an address that is a function of the m input bits, the cryptographic calculation process is modified by replacing each nonlinear transformation of m bits into n bits, applied to an intermediate m-bit variable playing the role of an input variable E in the standard calculation process, with a partial nonlinear transformation of km bits into kn bits applied to the set k of partial intermediate m-bit variables v1 through vk. This partial nonlinear transformation is described and embodied by k conversion tables of km bits into n bits, each of the inputs of the conversion tables receiving a value obtained by applying a secret bijective function $\phi_j$ to the function $f(v_1, \ldots, v_k)$ of the partial intermediate variables in accordance with the relation $\phi_j$ of $(v_1, \ldots, v_k)$, with $j \in [1,k]$. The aforementioned application $\phi_j$ of $(v_1, \ldots, v_k)$ is performed by direct evaluation of a resulting value which, applied to the input of the corresponding conversion table 1 through k, makes it possible to read n output bits of the transformation v'$_1$ or v'$_2$ or . . . v'k at an address that is a function of these m input bits.

As in the first example above, and in connection with FIG. 4E, it is noted that for Variant No. 2, k=2, m=6 and n=4.

Moreover, in a simplified version, the bijective functions $\phi_1$ through $\phi_k$ are identical.

In order for Condition No. 2 to be satisfied, it is necessary to choose the bijective transformation $\phi$ or bijective functions $\phi_1$ through $\phi_k$ such that the calculation of $v_0=\phi(v_1 \oplus v_2)$ can be done without having to recalculate $v_1 \oplus v_2$. Two examples of choices for the function $\phi$ are given below:

EXAMPLE 1

A Linear Bijection $\phi$

A secret, linear bijective function of 6 bits into 6 bits is chosen for $\phi$. Within the framework of such a choice, all of the 6-bit values are considered as a vectorial space of dimension 6 in the finite body $F_2$ with two elements. In practice, choosing $\phi$ amounts to choosing a random invertible 6×6 matrix whose coefficients equal 0 or 1. With this choice of $\phi$, it is easy to see that Condition No. 2 is satisfied. In essence, to calculate $\phi(v_1 \oplus v_2)$, it is sufficient to calculate $\phi(v_1)$, then $\phi(v_2)$, and finally to calculate the "exclusive-OR" of the two results obtained.

For example, the matrix $$\begin{pmatrix} 1 & 1 & 0 & 1 & 0 & 0 \\ 1 & 1 & 0 & 1 & 0 & 1 \\ 0 & 1 & 1 & 0 & 1 & 0 \\ 1 & 1 & 1 & 0 & 1 & 0 \\ 0 & 1 & 1 & 1 & 1 & 0 \\ 0 & 0 & 1 & 1 & 0 & 1 \end{pmatrix}$$

is invertible. It corresponds to the linear bijection of 6 bits into 6 bits defined by:

$\phi(u_1, u_2, u_3, u_4, u_5, u_6) = (u_1 \oplus u_2 u_4, u_1 \oplus u_2 \oplus u_4 \oplus u_6, u_2 \oplus u_3 \oplus u_5, u_1 \oplus u_2 \oplus u_3 \oplus u_5, u_2 \oplus u_3 \oplus u_4 \oplus u_5, u_3 \oplus u_4 \oplus u_6)$ If we take $v_1 = (v_{1,1}, v_{1,2}, v_{1,3}, v_{1,4}, v_{1,5}, v_{1,6})$ and $v_2 = (v_{2,1}, v_{2,2}, v_{2,3}, v_{2,4}, v_{2,5}, v_{2,6})$, then in order to calculate $\phi(v_1 \oplus v_2)$, we successively calculate:

$\phi(v_1) = (v_{1,1} \oplus v_{1,2} \oplus v_{1,4}, v_{1,1} \oplus v_{1,2} \oplus v_{1,4} \oplus v_{1,6}, v_{1,2} \oplus v_{1,3} \oplus v_{1,5}, v_{1,1} \oplus v_{1,2} \oplus v_{1,3} \oplus v_{1,5}, v_{1,2} \oplus v_{1,3} \oplus v_{1,4} \oplus v_{1,5}, v_{1,3} \oplus v_{1,4} \oplus v_{1,6})$;

$\phi(v_2) = (v_{2,1} \oplus v_{2,2} \oplus v_{2,4}, v_{2,1} \oplus v_{2,2} \oplus v_{2,4} \oplus v_{2,6}, v_{2,2} \oplus v_{2,3} \oplus v_{2,5}, v_{2,1} \oplus v_{2,2} \oplus v_{2,3} \oplus v_{2,5}, v_{2,2} \oplus v_{2,3} \oplus v_{2,4} \oplus v_{2,5}, v_{2,3} \oplus v_{2,4} \oplus v_{2,6})$.

Then we calculate the "exclusive-OR" of the two results obtained.

EXAMPLE 2

A Quadratic Bijection $\phi$

A secret quadratic bijective function of 6 bits into 6 bits is chosen for $\phi$. The term "quadratic" in this case means that each output value bit of the function $\phi$ is expressed by a polynomial function of degree two of the 6 input bits, which are identified with 6 elements of the finite body $F_2$. In practice, it is possible to choose the function $\phi$ defined by the formula $\phi(x) = t(s(x)^5)$, where s is a secret linear bijective application of $(F_2)^6$ into L, t is a secret linear bijective application of L into $(F_2)^6$, and L designates an algebraic extension of degree 6 of the finite body F2. The bjective characteristic of this function $\phi$ results from the fact that $a \cdot a5$ is a bijection on the extension L (the inverse of which is $b \cdot b38$). In order to establish that Condition No. 2 is still satisfied, it is sufficient to note that it is possible to write:

$\phi(v_1 \oplus v_2) = \psi(v_1, v_1) \oplus \psi(v_1, v_2) \oplus \psi(v_2, v_1)$ where the function $\psi(x, y) = t(s(x)^4 \cdot s(y))$.

For example, if we identify L with $F2[X]/(X^6 + X + 1)$, and if we take s and t of respective matrices $$\begin{pmatrix} 1 & 1 & 0 & 1 & 0 & 0 \\ 1 & 1 & 0 & 1 & 0 & 1 \\ 0 & 1 & 1 & 0 & 1 & 0 \\ 1 & 1 & 1 & 0 & 1 & 0 \\ 0 & 1 & 1 & 1 & 1 & 0 \\ 0 & 0 & 1 & 1 & 0 & 1 \end{pmatrix}$$

and $$\begin{pmatrix} 0 & 1 & 0 & 0 & 1 & 1 \\ 1 & 1 & 0 & 1 & 0 & 0 \\ 1 & 0 & 1 & 0 & 1 & 1 \\ 0 & 1 & 1 & 1 & 0 & 0 \\ 1 & 0 & 1 & 0 & 1 & 0 \\ 0 & 0 & 1 & 0 & 1 & 1 \end{pmatrix}$$

relative to the base (1, X, X2, X3, X4, X5) of L over F2 nd to the canonic base of $(F_2)^6$ over F2, we obtain the following quadratic bijection $\phi$ of 6 bits into 6 bits:

$\phi(u_1, u_2, u_3, u_4, u_5, u_6) =$
$(u_2 u_5 \oplus u_1 u_4 \oplus u_4 \oplus u_6 \oplus u_6 u_2 \oplus u_4 u_6 \oplus u_2 \oplus u_5 \oplus u_3 \oplus u_4 u_3,$
$u_2 u_5 \oplus u_5 u_1 \oplus u_1 u_4 \oplus u_4 \oplus u_6 \oplus u_4 u_5 \oplus u_2 \oplus u_3 \oplus u_3 u_1,$
$u_2 u_5 \oplus u_5 u_1 \oplus u_6 \oplus u_5 \oplus u_1 u_4 \oplus u_3 u_5 \oplus u_1 \oplus u_4 u_6 \oplus u_6 u_3 \oplus u_4 u_3 \oplus u_3 u_1,$
$u_1 u_4 \oplus u_2 u_3 \oplus u_6 u_1 \oplus u_4 u_6 \oplus u_5 \oplus u_6 u_3 \oplus u_4 u_3,$
$u_5 u_1 \oplus u_1 u_4 \oplus u_6 \oplus u_3 u_5 \oplus u_4 u_5 \oplus u_1 \oplus u_6 u_1 \oplus u_4 u_6 \oplus u_3 \oplus u_6 u_3 \oplus u_4 u_2,$
$u_4 \oplus u_6 \oplus u_3 u_5 \oplus u_1 \oplus u_4 u_6 \oplus u_6 u_3).$ To calculate $\phi(v_1 \oplus v_2)$, we use the function $\psi(x, y) = t(s(x)^4 \cdot s(y))$ of 12 bits into 6 bits, which yields the 6 output bits as a function of the 12 input bits in accordance with the following rules:

$\psi(x_1, x_2, x_3, x_4, x_5, x_6, y_1, y_2, y_3, y_4, y_5, y_6) =$
$(x_3 y_5 \oplus x_6 y_2 \oplus x_6 y_3 \oplus x_6 y_4 \oplus x_3 y_1 \oplus x_6 y_1 \oplus x_1 y_3 \oplus x_1 y_5 \oplus x_5 y_2 \oplus x_5 y_5$
$\oplus x_5 y_1 \oplus x_6 y_6 \oplus x_1 y_6 \oplus x_1 y_2 \oplus x_1 y_4 \oplus x_2 y_1 \oplus x_2 y_2 \oplus x_4 y_4 \oplus x_3 y_3$
$\oplus x_3 y_6 \oplus x_4 y_3 \oplus x_5 y_3,$
$x_4 y_5 \oplus x_3 y_1 \oplus x_6 y_1 \oplus x_2 y_5 \oplus x_5 y_1 \oplus x_6 y_6 \oplus x_1 y_2 \oplus x_2 y_1 \oplus x_2 y_2 \oplus x_4 y_1$
$\oplus x_4 y_4 \oplus x_3 y_3,$
$x_6 y_2 \oplus x_6 y_3 \oplus x_6 y_4 \oplus x_6 y_5 \oplus x_3 y_1 \oplus x_6 y_1 \oplus x_2 y_5 \oplus x_5 y_1 \oplus x_1 y_6 \oplus x_1 y_1$
$\oplus x_1 y_2 \oplus x_1 y_4 \oplus x_2 y_1 \oplus x_2 y_4 \oplus x_2 y_6 \oplus x_3 y_4 \oplus x_2 y_5 \oplus x_5 y_1 \oplus x_1 y_6 \oplus x_1 y_1$
$\oplus x_1 y_2 \oplus x_1 y_4 \oplus x_2 y_1 \oplus x_2 y_4 \oplus x_2 y_6 \oplus x_3 y_4 \oplus x_5 y_3,$
$x_3 y_1 \oplus x_6 y_2 \oplus x_2 y_2 \oplus x_5 y_3 \oplus x_4 y_3 \oplus x_5 y_6 \oplus x_6 y_3 \oplus x_2 y_3 \oplus x_4 y_6 \oplus x_6 y_5$
$\oplus x_1 y_3 \oplus x_5 y_5 \oplus x_2 y_4 \oplus x_4 y_2 \oplus x_4 y_5 \oplus x_3 y_5 \oplus x_4 y_3 \oplus x_6 y_1 \oplus x_4 y_1,$
$x_3 y_1 \oplus x_6 y_6 \oplus x_5 y_3 \oplus x_5 y_6 \oplus x_6 y_2 \oplus x_1 y_5 \oplus x_1 y_1 \oplus x_1 y_2 \oplus x_2 y_1 \oplus x_2 y_3$
$\oplus x_3 y_6 \oplus x_6 y_5 \oplus x_1 y_3 \oplus x_2 y_4 \oplus x_3 y_3 \oplus x_4 y_5 \oplus x_2 y_5 \oplus x_6 y_1 \oplus x_4 y_1 \oplus x_6 y_4$
$\oplus x_3 y_2,$
$x_6 y_6 \oplus x_4 y_4 \oplus x_5 y_4 \oplus x_5 y_6 \oplus x_6 y_3 \oplus x_1 y_6 \oplus x_1 y_1 \oplus x_1 y_2 \oplus x_2 y_1 \oplus x_6 y_5$
$\oplus x_2 y_4 \oplus x_4 y_2 \oplus x_4 y_5 \oplus x_3 y_5 \oplus x_6 y_1 \oplus x_6 y_4).$ Using these formulas, we successively calculate:

$\psi(v_1, v_1)$;
$\psi(v_1, v_2)$;
$\psi(v_2, v_1)$;
$\psi(v_2, v_2)$.

Then we calculate the "exclusive-OR" of the four results obtained. In a third variant, again in order to reduce the size of the ROM required to store the S-boxes, it is possible to simultaneously apply the ideas of the two preceding variants, Variant No. 1 and Variant No. 2: Variant No. 2 is used with the same secret bijection $\phi$ (of 6 bits into 6 bits) and the same secret random function A (of 6 bits into 6 bits) in the new implementation of each nonlinear transformation expressed in the form of an S-box.

The disadvantage of the solution described above for warding off DPA attacks is that is vulnerable to a DKDPA attack.

The utilization of the protection method described above makes it possible to render DPA or HO-DPA attacks ineffective. However, the new implementation of the secret key cryptographic algorithm may be vulnerable to another attack, which will hereinafter be called Differential Key and Differential Power Analysis, abbreviated DKDPA, even when the standard DPA attack fails. We will now describe the general principle of this attack.

Let us assume that the attacker has in his possession a small number of computer systems, for each of which he knows the secret key of the cryptographic algorithm it uses.

For each computer system, even though he already knows the secret key, he applies the DPA attack exactly as though he did not know the secret key. Using the principle described above, he forms a hypotheses on 6 bits of the key, and for each choice of these 6 bits, he obtains 64 curves representing differences from the average consumption curves.

For certain implementations of the algorithm, it is possible for the DPA to reveal unusual phenomena for certain choices of these 6 key bits (i.e., unusual peaks or dips for one of the 64 curves). Of course, this particular choice of 6 key bits does not correspond to the true key, but the "exclusive-OR" between these 6 bits (lets call them the K') and the 6 corresponding bits of the true key (let's call them the K) is often found to be a constant C, which means that there is always $K \oplus K' = C$ for each computer system for which the attacker knows the secret key.

If this is actually the case, then the attacker can easily find the bits of a real unknown key: he applies the standard DPA attack, then notes the particular choices K' of the 6 bits that yield an unusual curve, and finally deduces K from it by calculating $K \oplus K' = C$, where C has been obtained previously.

SUMMARY OF THE INVENTION

One of the objects of the invention is to eliminate this vulnerability of computer systems to DKDPA attacks.

A more precise examination shows that the attacks of the DKDPA type described above are made possible by the fact that the implementation of the cryptographic calculation process used by the computer system or systems is always the same, no matter what the electronic element involved and no matter what the secret key used by the cryptographic process.

The object of the method that is the subject of the present invention is to eliminate the risk of DKDPA attacks on data processing or computer systems using a secret key cryptographic process.

The method for protecting one or more computer systems using a secret key cryptographic calculation process, which is the subject of the present invention, is remarkable in that the implementation of the secret key cryptographic calculation process is dependent on secret data.

According to another characteristic, for each computer system and for each secret key, the way in which said secret data is used to perform said cryptographic calculation is public.

According to another characteristic, there are at least two pieces of secret data used by said computer systems.

According to another characteristic, each of the computer systems contains at least one specific piece of secret data.

Consequently, another subject of the present invention is a way of performing the cryptographic calculation that can easily be made different from one computer system to another, or for the same computer system, from the utilization of one secret key to another.

This object is achieved through the fact that in each of the computer systems, there are at least two pieces of secret data, corresponding to the various secret keys used by this computer system.

According to another characteristic, in each of the computer systems, each secret key used by said cryptographic calculation corresponds to a specific piece of secret data.

According to another characteristic, the method, which uses a cryptographic calculation process using nonlinear transformations of km bits into kn bits described by k conversion tables of km bits into n bits in which n output bits of the transformation are read at an address that is a function of the km input bits, is characterized in that for each of these nonlinear transformations, said k tables are part of the secret data.

According to another characteristic, the method for protecting one or more computer systems uses a cryptographic calculation process using nonlinear transformations of km bits into kn bits described by k conversion tables of km bits into n bits in which n output bits of the transformation are read at an address obtained by applying a secret bijective function to an m-bit value, itself obtained by applying a public function of the km input bits of the nonlinear transformation, characterized in that for each of these nonlinear transformations, the k tables are part of the secret data.

According to another characteristic, for each of the nonlinear transformations, the secret bijective function is also part of the secret data.

According to another characteristic, the secret data is stored in the $E^2PROM$ memory of said microcomputer card.

According to another characteristic, a conversion table calculation program is stored in each computer system and activated by a given event in order to calculate the tables and store all or part of these tables in the secret data.

According to another characteristic, the given event is the exceeding of a given value by a counter.

Another object of the invention is a utilization of this method.

This object is achieved through the fact that the method is used to protect a cryptographic calculation process supported by the DES, Triple DES and RSA algorithms.

A final object of the invention is to define one or more computer systems that resist DPA and DKDPA attacks.

This object is achieved through the fact that the computer system that implements the protection process, comprising means for storing a modified cryptographic algorithm that adheres to the computational phases of the standard cryptographic algorithm and uses a secret encryption key contained in a secret area of storage means, and means for executing this modified cryptographic algorithm, is characterized in that the computer system comprises first secret means for replacing each intermediate variable required for the computational phases of the standard algorithm with a plurality (k) of partial intermediate variables, second means for applying a nonlinear transformation table to each of these partial intermediate variables, and third means for reconstituting the final result corresponding to the utilization of the standard encryption algorithm from results obtained on the partial variables.

According to another characteristic, the secret data of the computer system includes at least one first random variable $v_1$ constituting at least one secret partial variable, and the modified algorithm determines at least one other partial variable, for example $v_2$, by applying a first secret function to the intermediate variable v and the secret partial variable or variables $v_1$.

According to another characteristic, the modified algorithm applies the nonlinear transformations to the partial variables $v_1$ and $v_2$ by using tables, at least one of which A, formed by random selection, is stored in the secret data Ds, the other tables required for the calculations being able to be stored in the nonvolatile memory, the various computational rounds of the standard algorithm are executed, each time using the tables on the partial variables, and in the last round, the algorithm calculates the result by combining the partial variables in accordance with a second secret function.

According to another characteristic, the first secret means of the modified algorithm are constituted by a function f, linking the partial intermediate variables and each intermediate variable (v), such that the knowledge of one value of this intermediate variable never makes it possible to deduce all of the particular partial values $v_i$ such that there exists a (k−1)-tuple $(v_1, \ldots, v_{i−1}, v_{i+1}, \ldots v_k)$ that satisfies the equation $f(v_1, \ldots, v_i, \ldots, v_k)=v$.

According to another characteristic, the second means of the modified algorithm are constituted by k partial conversion tables and among the k partial conversion tables, k−1 partial conversion tables contain secret random variables.

According to another characteristic, the second means of the modified algorithm comprise k conversion tables, each of these conversion tables receiving as input a value obtained by applying a secret bijective function $\phi_1$ to said function $f(v_1, \ldots, v_k)$ of the partial intermediate variables in accordance with the relation $\phi_j$ of $(v_1, \ldots, v_k)$, $j \in [1,k]$, this application $\phi_j$ of $(v_1, \ldots, v_k)$ being performed by direct evaluation of a resulting value, this resulting value, applied to the input of the conversion table, making it possible to read n output bits of the transformation at an address that is a function of these m input bits.

According to another characteristic, the second means of the modified algorithm replace each nonlinear transformation applied to an intermediate variable of the standard cryptographic calculation process, without a separation, with a partial nonlinear transformation of km bits into kn bits applied to all of the partial intermediate variables, (k−1)n of said output bits of this transformation being calculated as a polynomial function of the km input bits, and the n remaining bits of said output bits being obtained by reading a conversion table in which the n remaining bits are read at an address that is a function of the km input bits.

According to another characteristic, the operations performed by the modified algorithm in the various parts resulting from the separation of the cryptographic calculation process into several distinct calculation process parts are executed sequentially.

According to another characteristic, the operations performed in the various parts resulting from the separation of the cryptographic calculation process into several distinct calculation process parts are executed in interleaved fashion.

According to another characteristic, the operations performed in the various parts resulting from the separation of the cryptographic calculation process into several distinct calculation process parts are executed simultaneously in the event of multiprogramming.

According to another characteristic, the operations performed in the various parts resulting from the separation of the cryptographic calculation process into several distinct calculation process parts are executed simultaneously in various processors working in parallel.

According to another characteristic, the computer system includes a conversion table calculation program stored in each computer system and means for the activation by a given event of the calculation of the tables and for the storage of all or part of these tables in the secret data.

According to another characteristic, a counter stores a value that is incremented with each cryptographic calculation so as to constitute the given event for activating the calculation of the tables when a given value is exceeded.

BRIEF DESCRIPTION OF THE DRAWINGS

Other characteristics and advantages of the present invention will be more clearly understood with the reading of the description given in reference to the drawings below, in which.

DESCRIPTION OF THE PREFERRED EMBODIMENT(S)

Figure 1:
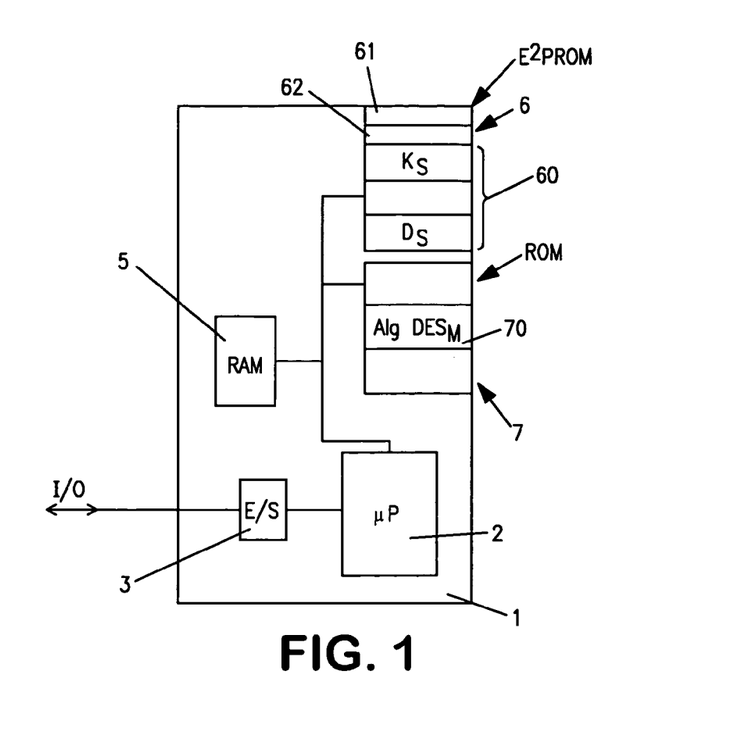
FIG. 1 represents a computer system in which the modified encryption algorithm is used according to the method of the invention.

The invention will be described below in connection with FIG. 1 and in comparison with the embodiment of the prior art represented in FIG. 4F.

A computer system can be constituted by a computer security module installed in a larger device, such as for example a server or a terminal. This computer system can be constituted by one or more integrated circuits incorporated into the larger device or even by a chip card, generally called a "smart card" when it includes a microprocessor or microcontroller connected to the larger device by a connector with or without contact. A standard encryption algorithm, such as for example DES, can be installed in the nonvolatile memory, for example a ROM (7), of the computer system (1). The microprocessor (2) of this computer system (1) executes this algorithm by reading, through the bus (4) that links it to the various memories, the instructions contained in the ROM (7) in order to perform the steps of the encryption method described in connection with FIGS. 2A and 2B by combining the secret encryption key (Ks) contained in a secret area (60) of a nonvolatile memory of the computer system, for example a programmable memory (6) of the $E^2$PROM type, with the information E to be encrypted which is, for example, temporarily stored in a volatile memory (5), for example a RAM. The microprocessor, associated in a single integrated circuit with its RAM, ROM and $E^2$PROM memories, constitutes what is called a microcontroller or microcomputer. The microprocessor dialogues with the larger device through an input/output circuit (3) and no access to the declared secret area (60) of the nonvolatile memory is permitted through any circuit other than the microprocessor (2). It alone can read the key (Ks) and use it in connection with the standard encryption method described with the aid of FIGS. 2A and 2B to produce the encrypted message Mc=DES(E,Ks).

The invention consists of modifying the algorithm used for the encryption in order to construct a modified algorithm ($DES_M$) that adheres to the same phases as the calculation process of the standard algorithm (DES). Thus, in the case of DES, the modified algorithm performs a separation of the cryptographic calculation process of the standard DES into several distinct calculation process parts executed in parallel and using partial intermediate results (called partial variables) distinct from those of the standard cryptographic calculation, and this separation is performed by using secret data (Ds) contained in the secret area (60) of the memory (6) of the computer system (1). This modified algorithm produces a result Mc by reconstituting the final value from the partial intermediate results, such that $Mc=DES_M(E,Ks,Ds)$ $=DES(E,Ks)$, equal to the result that would have been obtained by the standard algorithm. It will be noted that the computer systems thus obtained are entirely compatible with those having a standard encryption (hereinafter called standard systems) and can therefore be used in place of standard systems in applications or places where the standard systems would risk being exposed to an attack, without any need to change those that are in secure locations.

This modified algorithm includes secret means for replacing each intermediate variable of the standard algorithm with several partial intermediate variables, and means for applying a nonlinear transformation table to each of these partial intermediate variables, and secret means for reconstituting the final result corresponding to the utilization of the standard encryption algorithm from the results obtained on the partial variables. Thus, since a hacker no longer knows the relation between the partial variables and the final result, he is no longer capable of discovering the secret encryption key (Ks) through a DPA attack.

For example, in the case of the protection method of the DES algorithm described above, the implementation of the modified cryptographic calculation process is made dependent on the data of the k conversion tables used to calculate each nonlinear transformation of km bits into kn bits. These k tables constitute the secret data (Ds). Moreover, in the case of variants 2 and 3, the implementation of the cryptographic calculation process is made dependent on the data of the secret bijective applications $\phi_1, \phi_2, \ldots, \phi_k$, which are also part of the secret data.

Thus, the modified algorithm uses the secret bijective function contained in the secret data (Ds) in the computational phases where this is necessary, and uses the conversion tables, also contained in the secret data, in other the computational phases.

In the case of the example of the DES algorithm described above, the way in which this secret data is used is public.

It is quite clear that the invention has been illustrated in the case of the encryption algorithm called DES, but the same principle and the same method can be used with any other known encryption method, such as triple DES or RSA.

In order to make attacks of the DKDPA type ineffective on the computer system or systems, it is also necessary to choose a piece of secret data (Ds) that is not always the same from one computer system to another or from the utilization of one secret key to another. For this reason, it is preferable to place it in a programmable memory in order to be able to change it easily from one computer system to another. In the above example of DES, it is clear that it is easy to choose a new value for the secret data from the k conversion tables used to calculate each nonlinear transformation of km bits into kn bits; it is possible, for example, to randomly choose (k−1) tables, then deduce the kth table through a simple calculation. Likewise, in the case of variants 2 and 3, it is possible to choose (k−1) tables randomly, and the secret bijective applications $\phi_1, \phi_2, \ldots, \phi_k$ equally randomly, then deduce the $k^{th}$ table from them, again through a simple calculation.

In the case where the computer systems are one or more microcomputer cards, the secret data (Ds) on which the implementation of the secret key cryptographic process depends can be stored in the $E^2PROM$ memory (6). This makes it possible to change it from one card to another in the process of customizing the card, during which one or more secret keys are generally entered in the $E^2PROM$ of said card. It is also possible to change this secret data written in the $E^2PROM$ memory when it is necessary to change one or more of the secret keys contained in the card.

In the strongest version of the invention, the secret data depends on both the microcomputer card in question and the secret key used by the cryptographic calculation process. For example, the secret data is chosen randomly each time a secret key is entered into a card. This actually amounts to entering a pair (secret key Ks, secret data Ds) into the $E^2PROM$ memory of the microcomputer card each time, instead of entering only the secret key. In a variant of embodiment of the invention, given as an illustrative but non-limiting example, the secret data includes at least one first random variable $v_1$ constituting at least one secret partial variable, and the modified algorithm determines at least one other partial variable, for example $v_2$, by applying a secret function to the intermediate variable v and the secret partial variable or variables $v_1$. This secret function can be, for example, an exclusive-OR such as:

$$v_2 = v_1 \oplus v.$$

The modified algorithm applies the nonlinear transformations to the partial variables v1 and v2 by using tables, at least one of which A, formed by random selection, is stored in the secret data Ds, the other tables required for the calculations being able to be stored in the nonvolatile memory. The various computational rounds of the standard algorithm are executed, each time using the tables on the partial variables, and in the last round the algorithm calculates the result by combining the partial variables in accordance with a second secret function, which can be the inverse of the preceding one.

Figure 3:
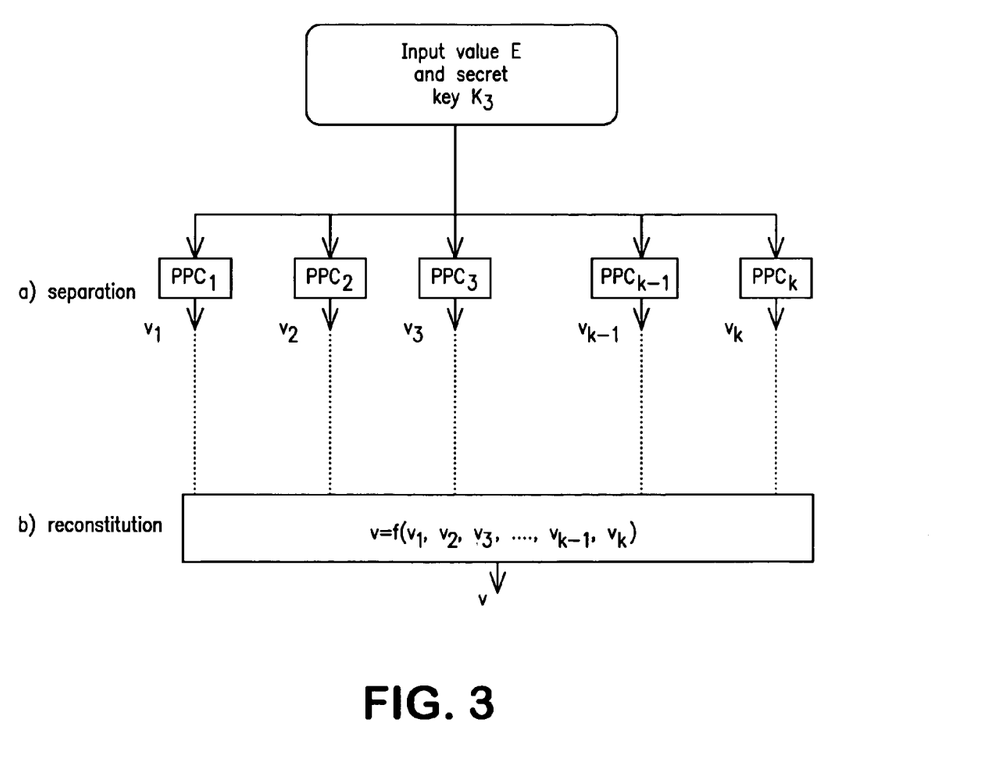
FIG. 3 represents a general flow chart illustrating a partitioning method according to a prior invention.

All of the variants described in reference to FIGS. 3 through 4F are also part of the invention in that they incorporate one or more of the elements involved in the modification of the algorithm into the secret data contained in programmable nonvolatile memory (6). The elements involved in the modification of the algorithm are either the secret function f, or partial conversion tables, or a secret random conversion table A associated by a calculation with other conversion tables contained in a non-secret part of programmable (6) or non-programmable (7) memory, or a polynomial function and one or more conversion tables, or a secret bijective function (p and a secret random transformation A, or even a secret quadratic function.

In another variant of embodiment of the invention, the program for calculating the S-boxes or conversion tables, normally present in customized machines, can be downloaded or written during a pre-customization phase into the secret area (61) of the programmable nonvolatile $E^2PROM$ memory (6) and activated during a customization phase by an order from the outside, executable only once during the customization phase. Once the order is executed, the calculation program either sets a lock in nonvolatile memory that denies access to this program unless a specific key is presented, or in another embodiment, triggers the automatic erasure of this secret area (61). This variant makes it possible to implement the invention even with unmodified customized machines. The calculation of the S-boxes or conversion tables is performed by adhering to the principles mentioned above and by using, as a diversifier, a piece of information specific to the card in the process of being customized, such as the serial number of the card that was recorded in the pre-customization phase, the values obtained by this calculation being written into the secret data (60) of the secret area of the nonvolatile memory (6).

In another additional variant, the card includes an additional counter (62) in nonvolatile memory, which is incremented by the $DES_M$ algorithm with each execution of a DES calculation by the latter. The operating system of the card is capable of comparing the content of this counter to a given value n with each power-up of the card and to call the calculation program (61) in order to calculate new S-boxes or conversion tables in the event that the value n is exceeded. The operating system of the card or the calculation program handles the storage of the S-boxes in the secret data in accordance with a procedure defined by the calculation program (61) or the operating system and resets the counter. In addition, in this variant the $DES_M$ algorithm, prior to performing a DES calculation, verifies that the additional counter (62) has not exceeded the given value increased by a constant (n+c), in which c is a defined constant. If it has been exceeded, the algorithm assumes an attempted fraud and resets the card to zero.

Finally, it is clear that in all the embodiments described, the way in which the cryptographic calculation is performed depends on the modification of the $DES_M$ algorithm, which itself depends on the elements contained in the secret storage area.

Any combination of the different variants presented is also part of the invention.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A method for protecting one or more computer systems using the same secret key (Ks) cryptographic algorithm, each computer system having storage means for storing the secret key (Ks) and processing means for executing the cryptographic algorithm, the method comprising:
    storing a secret data (Ds) in a secret area of the storage means;
    separating a standard cryptographic algorithm into a plurality of simultaneous calculation processes based on the secret data (Ds);
    creating a plurality of partial intermediate variables corresponding to each intermediate variable of the standard cryptographic algorithm;
    applying nonlinear transformations to each of the plurality of partial intermediate variables to create a plurality of partial results; and
    reconstituting a final result, corresponding to a result of the standard cryptographic algorithm, from the plurality of partial results.

2. The method according to claim 1, wherein the secret data (Ds) includes:
    a secret function f;
    a plurality of partial conversion tables;
    a secret random conversion table associated with a calculation based on conversion tables stored in a non-secret area of the storage means;
    a polynomial function and one or more conversion tables;
    a bijective secret function and a random secret transformation; and
    a quadratic secret function.

3. The method according to claim 1, wherein, for each of the computer systems, the secret key (Ks) and the secret data (Ds) are entered into a programmable, non-volatile memory.

4. A method according to claim 1, wherein the nonlinear transformations include nonlinear transformations of km bits into kn bits described by k conversion tables in which n output bits of the transformation are read at an address that is a function of the km input bits, and for each of said nonlinear transformations, said k tables are part of the secret data (Ds).

5. A method according to claim 1, wherein the nonlinear transformations include nonlinear transformations of km bits into kn bits described by k conversion tables in which n output bits of the transformation are read at an address obtained by applying a secret bijective function ($\phi$) to an m-bit value, itself obtained by applying a public function of the km input bits of the nonlinear transformation, and for each of said nonlinear transformations, said k tables are part of the secret data (Ds).

6. The method according to claim 1, further comprising storing a conversion table calculation program in each computer system and activating the calculation program by a given event in order to calculate tables and store all or part of said tables in the secret data (Ds).

7. A method according to claim 5, wherein for each of the nonlinear transformations, the secret bijective function ($\phi$) is also part of the secret data.

8. A computer system, comprising:
    storage means for storing a secret encryption key and secret data in a secret area of the storage means; and
    at least one processor, coupled to the storage means, for modifying a standard secret key cryptographic algorithm into calculation processes based on the secret data, the processor operating to:
        separate the standard secret key cryptographic algorithm into a plurality of simultaneous calculation processes based on the secret data,
        replace each intermediate variable of the standard secret key cryptographic algorithm with a plurality of partial intermediate variables,
        apply nonlinear transformations to each of the plurality of partial intermediate variables to create a plurality of partial results, and
        reconstitute a final result, corresponding to a result of the standard secret key cryptographic algorithm, from the plurality of partial results.

9. A computer system according to claim 8, wherein the secret data stored in the secret area includes at least one first random variable $v_1$ constituting at least one secret partial variable, and the modified cryptographic algorithm determines at least one other partial variable $v_2$, by applying a first secret function to the intermediate variable v and the secret partial variable or variables $v_1$.

10. A computer system according to claim 9, wherein:
    the modified cryptographic algorithm includes tables used for applying the nonlinear transformations to the partial variables $v_1$ and $v_2$, at least one of said tables, formed by random selection, and being stored in the secret data, the other tables required for the calculations being stored in a nonvolatile memory, and
    the processor executes various computational rounds of the standard algorithm, each time using the tables on the partial variables, and calculates the final result in the last round of the algorithm by combining the partial results in accordance with a second secret function.

11. A computer system according to claim 8, wherein the modified cryptographic algorithm includes a function f, linking the partial intermediate variables and each intermediate variable (v), such that the knowledge of one value of said intermediate variable never makes it possible to deduce all of the particular partial values $v_i$ such that there exists a (k−1)-tuple $(v_1, \ldots, v_{i-1}, v_{i+1}, \ldots v_k)$ that satisfies the equation $f(v_1, \ldots, V_i, \ldots, v_k)=v$.

12. A computer system according to claim 8, wherein the secret data includes k partial conversion tables, and among the k partial conversion tables, k−1 partial conversion tables contain secret random variables.

13. A computer system according to claim 11, wherein the secret data includes k conversion tables, each of said conversion tables receiving an input a value obtained by applying a secret bijective function $\phi_1$ to said function $f(v_1, \ldots, v_k)$ of the partial intermediate variables in accordance with the relation $\phi_j$ of$(v_1, \ldots, v_k)$, j ∈ [1,k], this application $\phi_j$ of$(v_1, \ldots, v_k)$ being performed by direct evaluation of a resulting value, this resulting value, applied to the input of the conversion table, making it possible to read n output bits of the transformation at an address that is a function of these m input bits.

14. A computer system according to claim 8, wherein the processor operates to:
  replace each nonlinear transformation applied to an intermediate variable of the standard cryptographic calculation process, without a separation, with a partial nonlinear transformation of km bits into kn bits applied to all of the partial intermediate variables,
  calculate (k−)n of said output bits of this transformation as a polynomial function of the km input bits, and
  read the remaining n bits of said output bits by reading a conversion table in which the n remaining bits are read at an address that is a function of the km input bits.

15. A computer system according to claim 8, wherein the processor sequentially executes operations performed by the modified algorithm in the various parts resulting from the separation of the cryptographic calculation process into several distinct calculation process parts.

16. A computer system according to claim 8, wherein the processor executes in interleaved fashion, operations performed in the various parts resulting from the separation of the cryptographic calculation process into several distinct calculation process parts.

17. A computer system according to claim 8, wherein the processor simultaneously executes operations performed in the various parts resulting from the separation of the cryptographic calculation process into several distinct calculation process parts, in the event of multiprogramming.

18. A computer system according to claim 8, wherein the at least one processor includes different processors working in parallel, simultaneously executing the operations performed in the various parts resulting from the separation of the cryptographic calculation process into several distinct calculation process parts.

19. A computer system according to claim 8, wherein the secret data includes a conversion table calculation program stored in each computer system and activated by a given event of the calculation of the tables and for the storage of all or part of these tables in the secret data.

20. A computer system according to claim 8, further including a counter having means for storing a value that is incremented with each cryptographic calculation so as to constitute a given event for the activation, by activating means, of the calculation of the tables when a given value is exceeded.

21. A system according to claim 8, wherein the secret data includes a plurality of nonlinear transformation tables, each transformation table designed to be applied by the processor to a partial intermediate variable.

\* \* \* \* \*